United States Patent
Li et al.

(10) Patent No.: US 11,327,178 B2
(45) Date of Patent: May 10, 2022

(54) PIECE-WISE NETWORK STRUCTURE FOR LONG RANGE ENVIRONMENT PERCEPTION

(71) Applicant: Volvo Car Corporation, Gothenburg (SE)

(72) Inventors: Ying Li, Sunnyvale, CA (US); Sihao Ding, Mountain View, CA (US)

(73) Assignee: Volvo Car Corporation, Gothenburg (SE)

( * ) Notice: Subject to any disclaimer, the term of this patent is extended or adjusted under 35 U.S.C. 154(b) by 299 days.

(21) Appl. No.: 16/563,462

(22) Filed: Sep. 6, 2019

(65) Prior Publication Data
US 2021/0072391 A1    Mar. 11, 2021

(51) Int. Cl.
| | | |
|---|---|---|
| G06K 9/00 | (2022.01) | |
| G01S 17/89 | (2020.01) | |
| G05D 1/02 | (2020.01) | |
| G06T 1/00 | (2006.01) | |
| G06N 3/04 | (2006.01) | |
| G01S 17/04 | (2020.01) | |

(52) U.S. Cl.
CPC .............. G01S 17/89 (2013.01); G01S 17/04 (2020.01); G05D 1/024 (2013.01); G06K 9/00805 (2013.01); G06N 3/04 (2013.01); G06T 1/0007 (2013.01); *G06T 2207/10028* (2013.01)

(58) Field of Classification Search
CPC .......... G01S 17/89; G01S 17/04; G01S 17/10; G01S 17/931; G05D 1/024; G06T 1/0007; G06T 2207/10028; G06N 3/04; G06N 3/08; G06K 9/00805; G06K 9/6272; G06K 9/00791

USPC .......................................................... 382/106
See application file for complete search history.

(56) References Cited

U.S. PATENT DOCUMENTS

| | | | |
|---|---|---|---|
| 8,798,372 B1 | 8/2014 | Korchev et al. | |
| 9,869,754 B1 | 1/2018 | Campbell et al. | |
| 10,101,746 B2 | 10/2018 | Izzat et al. | |
| 10,120,079 B2 | 11/2018 | Pennecot et al. | |
| 10,395,144 B2* | 8/2019 | Zeng | G05D 1/0246 |
| 10,839,530 B1* | 11/2020 | Berger | G06N 3/0445 |
| 10,901,429 B2* | 1/2021 | Wang | G05D 1/0088 |
| 10,977,501 B2* | 4/2021 | Mao | G06K 9/4628 |
| 11,016,496 B2* | 5/2021 | Chen | G05D 1/0221 |
| 2018/0136332 A1* | 5/2018 | Barfield, Jr. | G06T 7/70 |
| 2018/0348374 A1* | 12/2018 | Laddha | G01S 7/4808 |
| 2019/0096086 A1* | 3/2019 | Xu | G06T 7/60 |

(Continued)

FOREIGN PATENT DOCUMENTS

| | | | | |
|---|---|---|---|---|
| EP | 3623990 A1 * | 3/2020 | ......... | G06K 9/00791 |
| EP | 3702802 A1 * | 9/2020 | ......... | G01S 13/931 |

*Primary Examiner* — Mahendra R Patel
(74) *Attorney, Agent, or Firm* — Shumaker & Sieffert, P.A.

(57) ABSTRACT

An apparatus and method for performing environment perception is described. An example technique may include receiving a point cloud from a sensor, such as a LiDAR sensor, the point cloud including a plurality of points representing positions of objects relative to the LiDAR sensor. The example techniques may further include dividing the point cloud into a plurality of distances ranges, processing the points in each distance range of the point cloud with a different section of a plurality of sections of a piece-wise network structure, and outputting environment perception data from the piece-wise network structure.

20 Claims, 7 Drawing Sheets

(56) References Cited

U.S. PATENT DOCUMENTS

| | | | |
|---|---|---|---|
| 2019/0147245 A1* | 5/2019 | Qi | G06K 9/3233 |
| | | | 382/103 |
| 2019/0147372 A1* | 5/2019 | Luo | G06K 9/6272 |
| | | | 706/20 |
| 2019/0147610 A1* | 5/2019 | Frossard | G06T 7/90 |
| | | | 382/103 |
| 2019/0163989 A1* | 5/2019 | Guo | G08G 1/167 |
| 2019/0163990 A1* | 5/2019 | Mei | G01C 21/32 |
| 2019/0188541 A1* | 6/2019 | Wang | G06K 9/6221 |
| 2019/0265714 A1* | 8/2019 | Ball | G06N 5/048 |
| 2019/0385025 A1* | 12/2019 | McMichael | G06K 9/66 |
| 2020/0158875 A1* | 5/2020 | Feng | G01S 7/4808 |
| 2020/0184718 A1* | 6/2020 | Chiu | G06T 7/33 |
| 2021/0042557 A1* | 2/2021 | Roy | G06K 9/00201 |
| 2021/0089794 A1* | 3/2021 | Chen | G06K 9/4671 |
| 2021/0201526 A1* | 7/2021 | Moloney | G06N 3/084 |

\* cited by examiner

PIECE-WISE NETWORK STRUCTURE FOR LONG RANGE ENVIRONMENT PERCEPTION

BACKGROUND

With the growth of self-driving technology and other driver-assistance technologies, vehicles are featuring an increasing number of sensors to perform environment perception. Environment perception may generally include determining the presence of vehicles, persons and other objects around the vehicle. As another example, sensors may be used to detect and identify different types of vehicles (e.g., bicycles, motorcycles, cars, trucks, buses, emergency vehicles, etc.). By determining the presence and type of vehicles and other objects around the vehicle, driver assistance systems and/or autonomous driving systems may make better decisions on how to operate the vehicle.

In addition, sensors may be used to estimate certain aspects of a person's pose. Pose estimation is a computer vision technique where a human figure is detected from image or video data. In addition to detecting the presence of a human figure, computer vision techniques may further determine the position and orientation of the limbs of the human figure (i.e., the pose). Pose estimation can be useful in many fields, including autonomous driving. For example, the pose of a person may be used to determine the attention and intention of a human (e.g., a pedestrian, traffic police officer, etc.). Autonomous driving applications for an automobile may use the predicted or inferred intention and attention of a person from the estimated pose to determine driving behaviors.

SUMMARY

In the examples described below, this application describes techniques and devices for performing environment perception techniques from point cloud data produced by one or more LiDAR (Light Detection and Ranging) sensors or other similar sensors. In the context of this disclosure, environment perception techniques may include one or more of objection detection and/or classification, vehicle detection and classification, object tracking, free space segmentation, drivable space segmentation, and/or pose estimation. In some examples, the data output from the environment perception techniques may be used to make driving decisions for an autonomous vehicle. However, the techniques of this disclosure are not limited to autonomous driving applications and may be used for any number of applications where environment perception may be useful. By using the output of a LiDAR sensor, e.g., as opposed to a camera sensor, environment perception may be performed quickly in difficult environments, including low-light environments.

A computing system may be configured to receive point cloud data from a LiDAR sensor or other similar sensors. The computing system may be configured to divide the point cloud data into a plurality of distance ranges. That is, the point cloud data may be divided into multiple parts, where each part represents a different distance range from the sensor. In general, point cloud data from a LiDAR sensor is more dense (e.g., there are more points in the point cloud) the closer in distance the points are to the sensor. The point cloud generally includes fewer and fewer points (e.g., the point cloud is less dense) at distances farther from the sensor. In some examples, the computing system may be further configured to convert the point cloud data into a structured data format, such as a frame of voxels (volume pixels).

The computing system may then process the point cloud using a deep neural network (e.g., a convolutional deep neural network) to perform one or more environment perception tasks. In accordance with the techniques of this disclosure, the deep neural network may be configured as a piece-wise network structure that includes a plurality of sections. Each section of the piece-wise network structure is configured to process a different distance range of the divided point cloud data. Since each distance range of the point cloud data will generally have a different density of points, each section of the piece-wise network structure may be configured to process a different density of input data. Similarly, each section of the piece-wise network structure may be configured to produce a different output. For example, the section of the piece-wise network structure that processes close distance range (e.g., dense) point cloud data may provide fine detail output. The section of the piece-wise network structure that processes further distance range (e.g., less dense) point cloud data may provide a coarser detail output.

In one example, this disclosure describes a method for environment perception, the method comprising receiving a point cloud from a sensor, the point cloud including a plurality of points representing positions of objects relative to the sensor, dividing the point cloud into a plurality of distances ranges, processing the points in each distance range of the point cloud with a different section of a plurality of sections of a piece-wise network structure, and outputting environment perception data from the piece-wise network structure.

In another example, this disclosure describes an apparatus configured to perform environment perception, the apparatus comprising a memory configured to receive a point cloud from a sensor, and one or more processors implemented in circuitry, the one or more processors in communication with the memory and configured to receive the point cloud from the sensor, the point cloud including a plurality of points representing positions of objects relative to the sensor, divide the point cloud into a plurality of distances ranges, process the points in each distance range of the point cloud with a different section of a plurality of sections of a piece-wise network structure, and output environment perception data from the piece-wise network structure.

In another example, this disclosure describes an apparatus configured to perform environment perception, the apparatus comprising means for receiving a point cloud from a sensor, the point cloud including a plurality of points representing positions of objects relative to the sensor, means for dividing the point cloud into a plurality of distances ranges, means for processing the points in each distance range of the point cloud with a different section of a plurality of sections of a piece-wise network structure, and means for outputting environment perception data from the piece-wise network structure.

In another example, this disclosure describes a non-transitory computer-readable medium may be configured to store instructions that, when executed, causes one or more processors to receive a point cloud from a sensor, the point cloud including a plurality of points representing positions of objects relative to the sensor, divide the point cloud into a plurality of distances ranges, process the points in each distance range of the point cloud with a different section of a plurality of sections of a piece-wise network structure, and output environment perception data from the piece-wise network structure.

The details of one or more embodiments of the invention are set forth in the accompanying drawings and the description below. Other features, objects, and advantages of the invention will be apparent from the description and drawings, and from the claims.

DETAILED DESCRIPTION

Environment perception techniques include techniques for detecting and classifying objects, vehicles, persons, and other features of the physical environment that may be sensed by a sensor. In the context of this disclosure, environment perception techniques may include one or more of object detection, objection detection and classification, vehicle detection and classification, object tracking, free space segmentation, drivable space segmentation, and/or pose estimation. In some examples, autonomous driving applications may use the output of environment perception tasks to make autonomous driving decisions. In addition, environment perception techniques may be used to make decisions in other driver-assistance related technologies, such as adaptive cruise control, lane following, collision mitigation braking, and other technologies.

In some examples, environment perception techniques may be performed on point cloud data received from a LiDAR sensor. Compared to other sensor types, LiDAR generally performs well in low light environments. However, point cloud data from LiDAR sensors is generally sparse (e.g., as compared to a camera). In addition, the density of point cloud data from a LiDAR sensor generally decreases for objects and other features positioned farther away from the sensor. That is, the point cloud is typically not uniform in density and generally includes more points for objects closer to the sensor (e.g., higher density data) and fewer points for objects farther from the sensor (e.g., lower density data).

Because point cloud data is generally sparse at longer distance ranges from the sensor, it can be challenging to perform long range environment perception tasks from point cloud data obtained from a LiDAR sensor. Furthermore, since the density of point cloud data varies across the captured distance range, designing process algorithms that can process the entirety of the point cloud becomes difficult.

The techniques of this disclosure utilize a piece-wise network structure (e.g., a piecewise convolutional deep neural network (DNN)), where each piece of the network structure is designed to accept a specific piece-wise input (e.g., a respective distance range of point cloud data) and produce a specific piece-wise output. A computing system configured to perform environment perception tasks may divide point cloud data received from a sensor (e.g., a LiDAR sensor) into a plurality of distance ranges. Each section of the piece-wise network structure may then process a separate range of the plurality of distance ranges, i.e., a separate distance range of the point cloud data, and produce a separate output. In general, the piece-wise network structure may output finer detailed environment perception data for more dense point cloud data at closer distance ranges, and may output coarser detailed environment perception data for less dense point cloud data at farther distance ranges.

Figure 1:
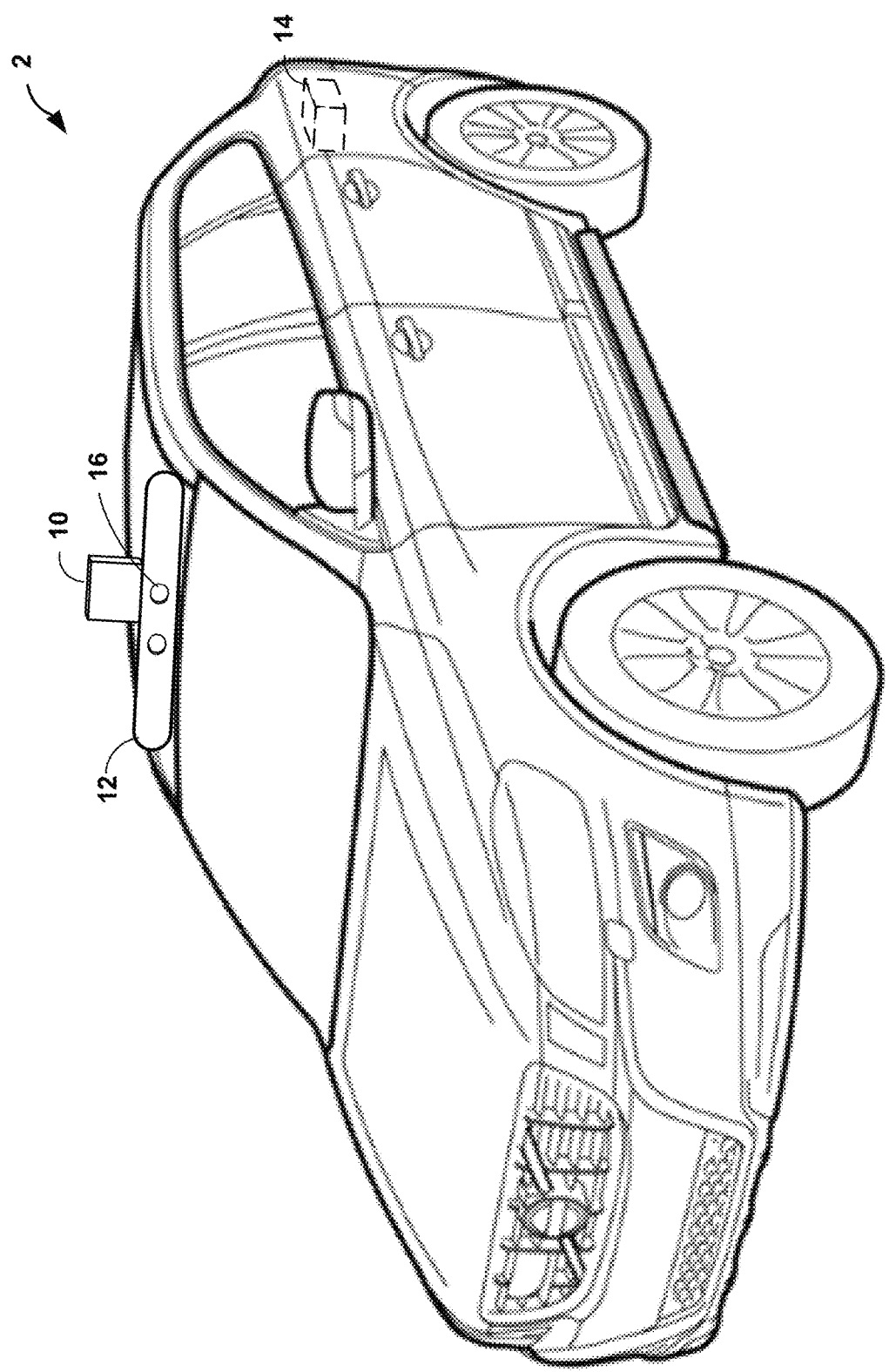
FIG. 1 is a conceptual diagram illustrating an example operating environment of the techniques of this disclosure.

FIG. 1 is a conceptual diagram illustrating an example operating environment of the techniques of this disclosure. In one example of the disclosure, automobile 2 may include components configured to perform one or more environment perception tasks. In this example, automobile 2 may include a LiDAR sensor 10, a computing system 14, and optionally, a camera(s) 16.

The techniques of this disclosure are described with reference to automotive applications, including autonomous driving applications. However, it should be understood that the techniques of this disclosure for environment perception may be used for other contexts. In the context of this disclosure, environment perception may be any techniques of detecting and identifying objects and other features of the environment in the vicinity of LiDAR sensor 10. Environment perception tasks may include one or more of object detection and classification, vehicle detection and classification, object tracking, free space segmentation, drivable space segmentation, person detection, and/or pose estimation.

Automobile 2 may be any type of passenger vehicle. LiDAR sensor 10 may be mounted to automobile 2 using bracket 12. In other examples, LiDAR sensor 10 may be mounted to automobile 2 in other configurations or integrated in or carried by structure of the automobile, such as bumpers, sides, windshields, or the like. Additionally, automobile 2 may be configured to use a plurality of LiDAR sensors. As will be explained in more detail below, computing system 14 may be configured to receive point cloud data from LiDAR sensor 10 and perform environment perception tasks using a piece-wise network structure, wherein each section of the piece-wise network structure is configured to process a different distance range of the point cloud data.

LiDAR sensor 10 includes one or more lasers that are configured to emit laser pulses. LiDAR sensor 10 further includes one or more receivers to receive laser light reflected off objects near LiDAR sensor 10. LiDAR sensor 10 measures distance to an object by illuminating the object with pulsed laser light and measuring the reflected pulses. Differences in return times and wavelengths of the reflected pulses are used to determine a 3-D representation of one or more objects (e.g., people).

LiDAR sensor 10 may further include a global positioning sensor (GPS) or similar sensors to determine the exact physical location of the sensor and objects sensed from the reflected laser light. LiDAR sensor 10 may be further configured to detect additional information, like intensity. The intensity of a point in the point cloud may indicate the reflectivity of the object detected by LiDAR sensor 10. Typically, the 3-D representation captured by LiDAR sensor 10 is stored in the form of a point cloud. Point clouds are a collection of points that represent a 3D shape or feature. Each point has its own set of X, Y and Z coordinates and in some cases additional attributes (e.g., GPS location and intensity). The resulting point clouds of the LiDAR collection method may be saved and/or transmitted to computing system 14.

While LiDAR sensors are described in this disclosure, the techniques for environment perception described herein may be used with the output of any sensor that works in low light and/or outputs point cloud data. Additional sensor types that may be used with the techniques of this disclosure may include, for example, radar, ultrasonic, camera/imaging sensors, and/or sonar sensors.

Computing system 14 may be connected to LiDAR sensor through wired or wireless communication techniques. Computing system may include one or more processors that are configured to receive the point cloud from LiDAR sensor 10. As will be explained in more detail below, computing system 14 may be configured to environment perception tasks using a piece-wise network structure. For example, computing system 14 may be configured to process point cloud data from the piece-wise network structure (e.g., a piecewise convolutional deep neural network (DNN)), where each piece of the network structure is designed to accept a specific piece-wise input (e.g., distance range of point cloud data) and produce a specific piece-wise output.

In one example of the disclosure, computing system 14 may be configured to receive the point cloud from a sensor (e.g., LiDAR sensor 10), the point cloud including a plurality of points representing positions of objects relative to the sensor. Computing system 14 may be further configured to divide the point cloud into a plurality of distances ranges, process the points in each distance range of the point cloud with a different section of a plurality of sections of a piece-wise network structure, and output environment perception data from the piece-wise network structure.

One feature of the disclosure is that computing system 14 is configured to process point cloud data at different distance ranges differently, and the output of results (e.g., output of the environment perception tasks, such as object detection/classification) at different ranges is different. Since, the closer range point cloud data generally contains more dense point cloud data, the section of the piece-wise network structure that is configured to process the close range point cloud data is configured to output a higher quality prediction result (e.g., a finer detail prediction result) than a section of the piece-wise network structure configured to process point cloud data at longer distance ranges (e.g., data with low point density).

Accordingly, according to one feature of the disclosure, computing system 14 may process the points in each distance range of a plurality of different ranges with a different section of a piece-wise network structure. Computing system 14 may process points in a first distance range of a point cloud with a first section of the piece-wise network structure. Computing system 14 may process points in a second distance range of a point cloud with a second section of a piece-wise network structure. In this example, the second distance range is farther away from LiDAR sensor 10 than the first distance range. The second section of the piece-wise network structure does not process the first distance range. Likewise, the first section of the piece-wise network structure does not process the second distance range.

Bracket 12 may include one or more cameras 16. The use of a bracket 12 is just one example. The cameras 16 may be positioned in any suitable place on automobile 2. Automobile 2 may further include additional cameras not shown in FIG. 1. Computing system 14 may be connected to cameras 16 to receive image data. In one example of the disclosure, computing system 14 may be further configured to perform environment perception using camera-based techniques. For example, computing system 14 may be configured to perform environment perception tasks using both camera-based techniques and the LiDAR-based techniques described in this disclosure. Computing system 14 may be configured to assign weights to each of the perception outputs (e.g., detection of object, classification of object, pose, etc.) determined by the camera-based and LiDAR based techniques and determine a final perception output based on a weighted average of the determined poses. Computing system 14 may be configured to determine the weights based on a confidence level for each of the techniques. For example, LiDAR-based techniques may have a higher confidence of being accurate, compared to camera-based techniques, in low-light environments.

Figure 2:
FIG. 2 illustrates an example point cloud in a top-down view.

FIG. 2 illustrates an example point cloud 30 captured by LiDAR sensor 10 (not shown, see FIG. 1). The left side of point cloud 30 includes data that is closest to LiDAR sensor 10, while the right side of point cloud 30 includes data this the farthest from LiDAR sensor 10. As can be seen in FIG. 2, LiDAR point cloud data at different distance ranges shows different characteristics (mainly due to point cloud density). Thus, in one aspect of the disclosure, computing system 14 may be configured to divide point cloud data 30 into multiple pieces, where each piece represents a different distance range. In this way, computing system 14 may process different distance ranges of point cloud 30 with different sections of a piece-wise network structure. The different sections of the piece-wise network structure are configured to process point clouds with different densities and produce environment perception outputs that correspond to the different point cloud densities. In general, the sections of the piece-wise network structure that process higher density point cloud data (e.g., for closer range data) produce finer detailed outputs, while sections of the piece-wise network structure that process lower density point cloud data (e.g., for longer range data) produce more coarse detailed outputs. Computing system 14 may divide point cloud 30 in a manner such that the point cloud data is broken into different pieces so that the pieces may be processed with different branches of the piece-wise network structure to detect features at different granularities.

In one example, computing system 14 may be configured to divide point cloud 30 into two or more sections based on fixed distances. That is, computing system 14 may be configured to divide point cloud 30 for every 50 meters captured. Of course, other distance ranges may be used (e.g., 25 meters, 75 meters, etc.). Some of the examples below show point cloud 30 being divided into three distance ranges. However, it should be understood that the techniques of this disclosure are applicable with two sections of point cloud data or four or more sections of point cloud data.

In other examples, computing system 14 may be configured to divide point cloud 30 based on the density of point cloud data available in the cloud. In this example, computing system 14 may be configured to measure the density of points in point cloud 30 across various distance ranges, and divide point cloud 30 at a determined distance range such that each distance range has a threshold density of point clouds. In this way, the distance range of point cloud data processed by the piece-wise network structure may be variable, but the density of point cloud data available for each section of the piece-wise network structure would remain roughly the same. In some examples, a technician may pre-calculate desired density and/or distance ranges to use for the different sections of the piece-wise network structure based on the actual sensor being used. For example, different sensors, including LiDAR sensors, may output point cloud data at different densities. The distance range and/or density range used for each section of the piece-wise network structure may be based on a function mapping distance to density (or density to distance) for a particular sensor. In this context, density may be the number of points per unit scanned area (e.g., per square meter).

Figure 3:
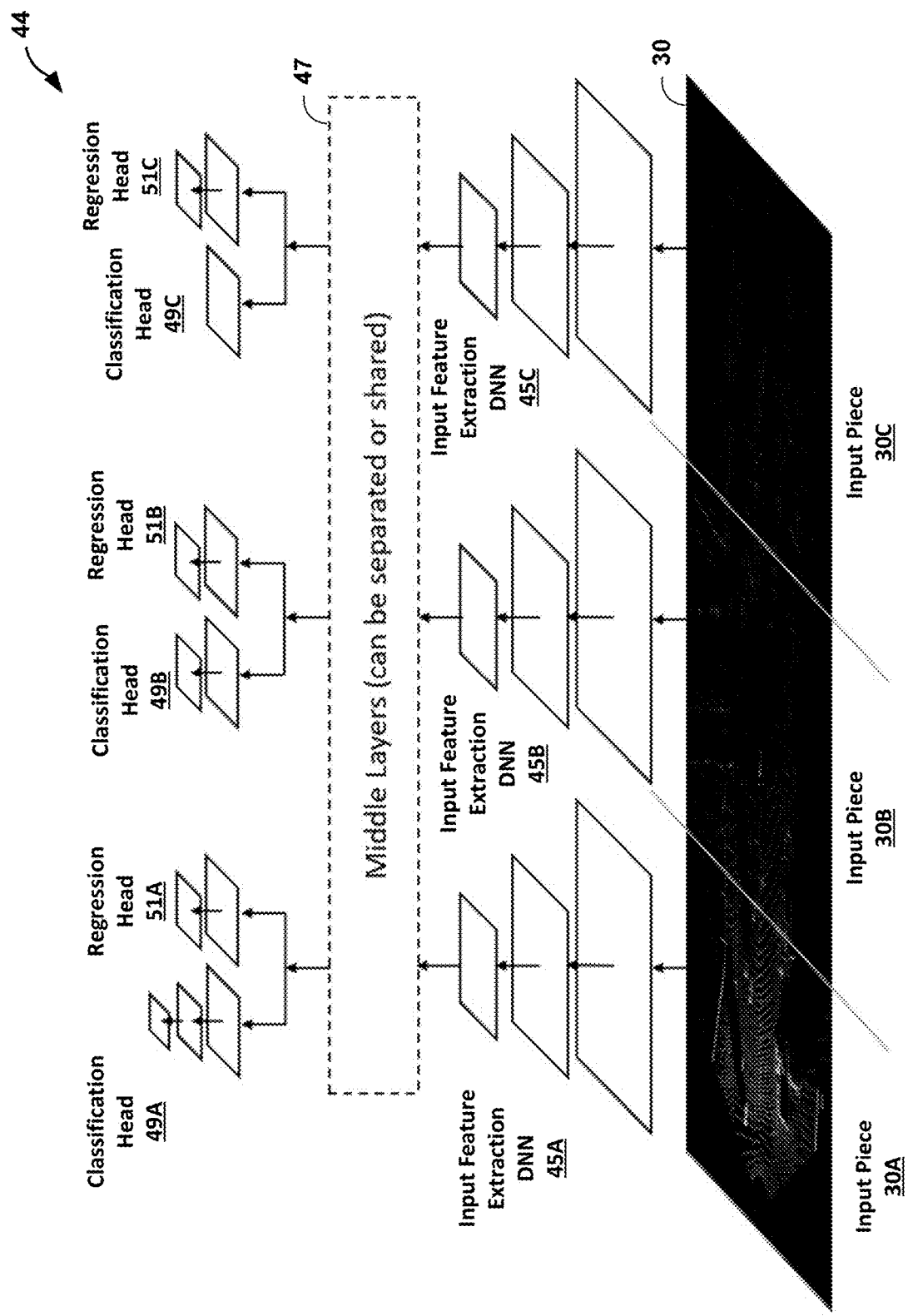
FIG. 3 is a block diagram illustrating an example piece-wise network structure.

FIG. 3 is a block diagram illustrating an example piece-wise network structure of a convolutional deep neural network (DNN) 44. The example of FIG. 3 is implemented as a DNN. However, it should be understood that the techniques of this disclosure may be used with other neural network structures that are divided into a piece-wise manner as described herein. As shown in FIG. 3, computing system 14 has divided point cloud 30 into three input pieces. Input piece 30A is point cloud data at a close range to LiDAR sensor 10. Input piece 30B is point cloud data at a middle range relative to LiDAR sensor 10, further than the close range point cloud data. Input piece 30C is point cloud data at a long range to LiDAR sensor 10, further than the middle range point cloud data. Again, in other examples, computing system 14 may be configured to divide point cloud 30 into more or fewer input pieces.

In the example of FIG. 3, DNN 44 includes three sections of a piece-wise network structure to process the three input pieces 30A, 30B, and 30C of point cloud 30. Each section of DNN 44 includes an input feature extraction DNN section. Input feature extraction DNN 45A is configured with one or more layers of a DNN to extract features of the dense point cloud data of input piece 30A. In general, layers of a DNN are computing nodes that perform some task (e.g., different kinds of transformations using different weights or coefficients) on the data received from the input or another layer. Input feature extraction DNN 45B is configured with one or more layers of a DNN to extract features of point cloud data of input piece 30B. In general, input piece 30B will include less dense point cloud data relative to input piece 30A. Input feature extraction DNN 45C is configured with one or more layers of a DNN to extract features of the point cloud data of input piece 30C. In general, input piece 30C will include less dense point cloud data relative to both input piece 30A and input piece 30B.

Each of the input feature extraction DNNs of DNN 44 may be configured to perform environment perception tasks (e.g., extract features from the point cloud data) at different levels of granularity. In general, input feature extraction DNN 45A will extract features at a finer level of detail than input feature extraction DNN 45B and 45C. Likewise, input feature extraction DNN 45B will extract features at a finer level of detail than input feature extraction DNN 45C. In some examples, the different branches of the piece-wise network structure of DNN 44 can be configured with the same basic network structure, but with different weights and/or training. For example, the type and number of levels of each section of the piece-wise network may be same, but they may be trained with different data sets and ultimately use different weightings. In other examples, the different branches of the piece-wise network structure of DNN 44 can be configured with different network structures. Regardless of how the different sections of the piece-wise network structure of DNN 44 are configured, by configuring the different sections of the piece-wise network structure of DNN 44 to specifically process different distance ranges and densities of point cloud data, environment perception accuracy can be improved.

As shown in FIG. 3, DNN 44 includes middle layers 47. Middle layers 47 are positioned between input feature extraction layers 45A-C, and the output layers (classification heads 49A-C and regression heads 51A-C). In some examples, the different sections of piece-wise network structure of DNN 44 may include shared layers in middle layers 47. Middle layers 47 may be layers of DNN that are between input feature extraction DNN section (input layers) and the output layers. That is, middle layers 47 may process LiDAR data after the input layers, but before the output layers. For some environment perception tasks, middle layers 47 may not differ much between different sections of the piece-wise network structure of DNN 44. As such, middle layers 47 may be shared for two or more sections. By sharing layers across two or more sections of the piece-wise network structure of DNN 44, computation and memory footprints can be reduced. In other examples, middle layers 7 can be separate (e.g., different for each section of the piece-wise network structure of DNN 44) all the way from the input to output layers.

DNN 44 also includes output layers for the sections of the piece-wise network structure of DNN 44 classification heads. Like input feature extraction DNN layers 45A-C, the output layers of the piece-wise network structure of DNN 44 may be configured to output different environment perception data based on different distance ranges and/or densities of point cloud data processed by each section. Again, in general, the output of the output layers of the piece-wise network structure of DNN 44 has a finer level of detail for dense and/or close range point cloud data, and the output has a coarser level of detail for less dense and/or farther range point cloud data.

As shown in FIG. 3, the output layers of the sections of the piece-wise network structure of DNN 44 include classifications heads 49A-C and regression heads 51A-C. In general, classification outputs of a DNN use labeled datasets. Through training, an operator transfers knowledge to the dataset of DNN 44 in order for DNN 44 to learn the correlation between labels and data. Outputs from classification heads 49A-C may generally identify a specific type of object, vehicle, human pose, and/or feature in the environment. Regression heads 51A-C generally output a continuous numerical value. In the context of environment perception, this continuous numerical value output by regression heads 51A-C may indicate the number of objects, vehicles, persons, and/or features detected in the environment and/or the probability that an object, vehicle, person, and/or feature is present.

As described above, the output of the different sections of the piece-wise network structure of DNN 44 may be different at different ranges of input data. For example, when performing an object detection environment perception task, regression head 51A may detect the presence of objects in the close distance range of point cloud data in input piece 30A. Classification head 49A may be configured to classify any detected objects in the close distance range of point cloud data in input piece 30A into a first plurality of classes. In one example, classification head 49A may classify detected objects into six classes: car, bus, truck, cyclist, motorcyclist, pedestrian.

At middle ranges, regression head 51B may detect the presence of objects in a middle-distance range of point cloud data in input piece 30B. Classification head 49B may be configured to classify any detected objects in the middle-distance range of point cloud data in input piece 30B into a second plurality of classes, which is smaller than the first plurality of classes used by classification head 49A. For example, classification head 49B may classify detected objects into three classes: four-wheeler, two-wheeler, and pedestrian. At far distance ranges, DNN 44 may disable classification head 49C. Instead, DNN 44 may only use regression head 51C to detect objects from the far distance range of point cloud data in input piece 30C. This is because there may not be enough data in input piece 30C to accurately make a classification. However, detection of objects in input piece 30C may be possible and valuable. By dividing DNN 44 into the piece-wise structure and tailoring the environment perception tasks to the density of input data, computing system 14 may increase the overall accuracy of environment perception tasks, reduce computation cycles, and lower the number of ambiguous results due to lower density data at longer ranges.

The above output scheme may apply to other environment perception tasks as well. Other perception tasks may include long-range object tracking, long range free space/drivable space segmentation, and long-range pose estimation.

When performing long range object tracking, classification head 49A and regression head 51A may output both tracking/detection and speed estimation for more dense point cloud data (e.g., input piece 30A and/or input piece 30B). For less dense, longer range data, regression head 51C may only output tracking/detection. Depending on the density of the data, other middle sections of the piece-wise network structure of DNN 44 may output both tracking/detection and speed estimation or only tracking detection.

Free space/drivable space segmentation processes determined areas around automobile 2 in which it is safe for the automobile to drive. For long range free space/drivable space segmentation, classification head 49A and regression head 51A may output high resolution/accuracy segmentation for more dense point cloud data (e.g., input piece 30A and/or input piece 30B). For less dense, longer range data, regression head 51C may only output a coarser resolution segmentation. Depending on the density of the data, other middle sections of the piece-wise network structure of DNN 44 may adjust the resolution/accuracy of the segmentation accordingly.

When performing long range pose estimation, classification head 49A and regression head 51A may output both person detection and per-person pose estimation for more dense point cloud data (e.g., input piece 30A and/or input piece 30B). For less dense, longer range data, regression head 51C may only output detected persons. Depending on the density of the data, other middle sections of the piece-wise network structure of DNN 44 may output both person detection and per-person pose estimation or only per section detection.

Figure 4:
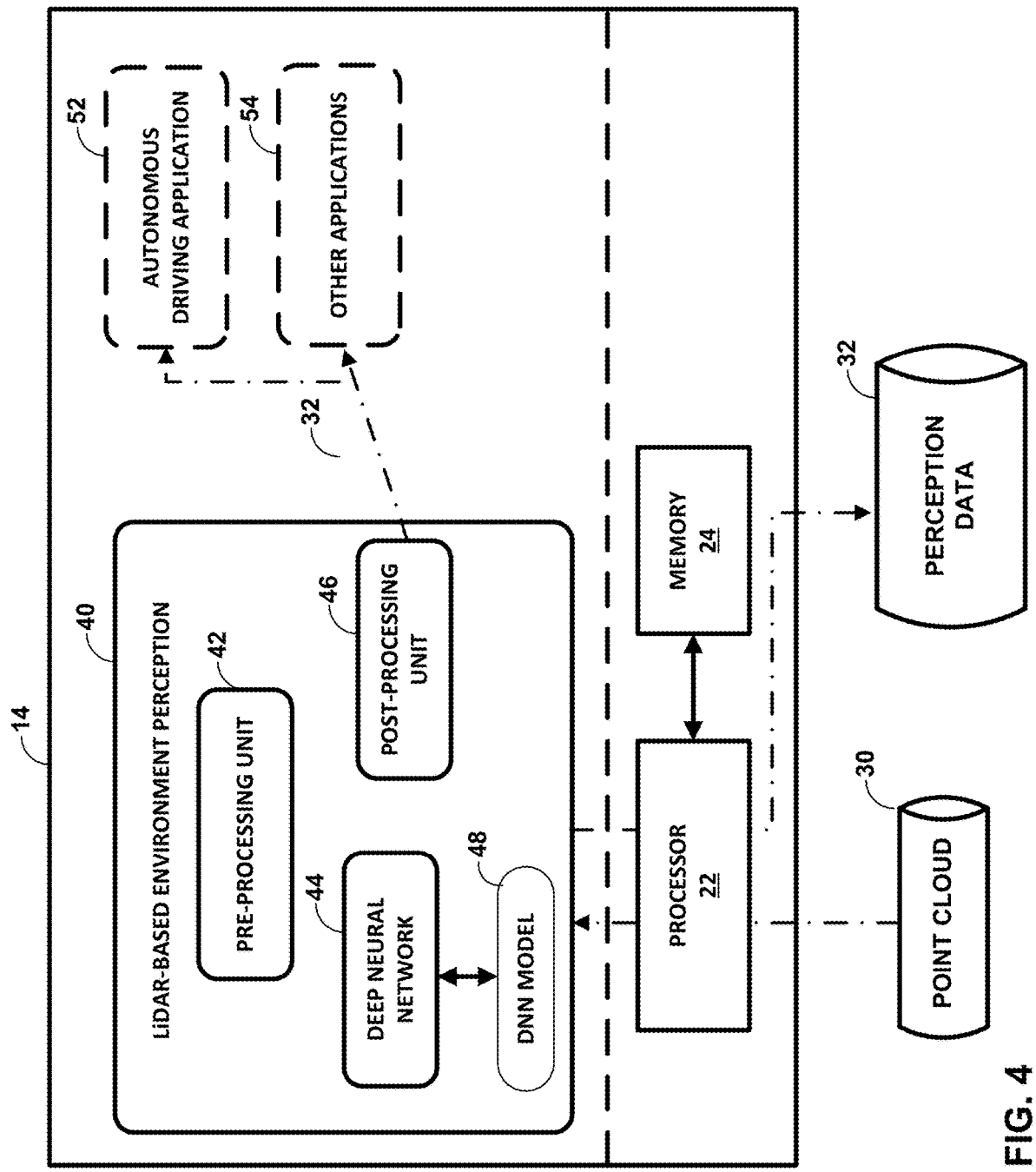
FIG. 4 is a block diagram illustrating an example apparatus configured to perform the techniques of this disclosure.

FIG. 4 is a block diagram illustrating an example apparatus configured to perform the techniques of this disclosure. In particular, FIG. 4 shows an example of computing system 14 of FIG. 1 in more detail. Again, in some examples, computing system 14 may be part of automobile 2. However, in other examples, computing system 14 may be a stand-alone system or may be integrated into other devices for use in other applications which may benefit from pose estimation.

Computing system 14 includes processor 22 in communication with memory 24. In some examples, computing system 14 may include multiple microprocessors. Processor 22 may be implemented as fixed-function processing circuits, programmable processing circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

In the example of FIG. 4, processor 22 may be configured to execute one or more sets of instructions in LiDAR-based environment perception module 40 to perform environment perception in accordance with the techniques of this disclosure. The instructions that define LiDAR-based environment perception module 40 may be stored in memory 24. In some examples, the instructions that define LiDAR-based environment perception module 40 may be downloaded to the memory 24 over a wired or wireless network.

In some examples, memory 24 may be a temporary memory, meaning that a primary purpose of memory 24 is not long-term storage. Memory 24 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Memory 24 may include one or more non-transitory computer-readable storage mediums. Memory 24 may be configured to store larger amounts of information than typically stored by volatile memory. Memory 24 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Memory 24 may store program instructions (e.g., LiDAR-based environment perception module 40) and/or information (e.g., point cloud 30 and perception data 32) that, when executed, cause processor 22 to perform the techniques of this disclosure.

The following techniques of the disclosure will be described with reference to processor 22 executing various software modules. However, it should be understood that each of the software modules described herein may also be implemented in dedicated hardware, firmware, software, or any combination of hardware, software, and firmware.

LiDAR-based environment perception module 40 may include a pre-processing unit 42, a deep neural network (DNN) 44, and a post-processing unit 46. As described above, DNN 44 may be configured with a piece-wise network structure. LiDAR-based environment perception module 40 is configured to receive point cloud 30 from a LiDAR sensor (e.g., LiDAR sensor 10 of FIG. 1). Pre-processing unit 42 is configured to make the unstructured raw input (i.e., point cloud 30) into structuralized frame (e.g., matrix data), so DNN 44 can process the input data.

Pre-processing unit 42 may be configured to process point cloud 30 into a structuralized frame in many ways. As described above, pre-processing unit 42 may be configured to divide point cloud 30 into a plurality of distance ranges. Pre-processing 42 may be further configured to convert point cloud 30 into voxels (volume pixels). Pre-processing unit 42 may be configured to perform such voxelization according to a pre-defined data structure for the voxels. For example, each of the voxels may be defined by a size of a three-dimensional (3D) bin (e.g., in terms of X, Y, and Z coordinates), as well as the type of data stored for a 3D bin. For example, each 3D bin (i.e., voxel) may include data indicating the number of points from point cloud 30 located in the bin, the location of the points from point cloud 30 in the bin, as well as the intensity of such points. Other examples of data that may be stored in the voxels include mean and variance of height, width, length (x, y, z coordinates), mean and variance of intensity/reflectivity, and other statistics of the point cloud within or even neighboring the voxel. In some examples, a voxel may include zero points from point cloud 30, one point from point cloud 30, or multiple points from point cloud 30. Using pre-defined bins may be referred to as manual voxelization. In other examples, pre-processing unit 42 may be configured to voxelize point cloud 30 in an adaptive manner, e.g., by using a neural network that takes raw point cloud 30 as input and outputs a structured (voxelized) frame.

DNN 44 receives the voxelized distance ranges of point cloud 30 from pre-processing unit 42. As described above, a deep neural network is a type of machine learning algorithm. DNN 44 may be configured with multiple layers of processing layers, each layer configured for determining and/or extracting features from the input data (in this case the voxelized frame of point cloud 30). Each successive layer of DNN 44 may be configured to use the output from the previous layer as input.

In some examples, DNN 44 may be configured as a convolutional deep neural network. A convolutional deep neural network is a type of deep, feed-forward neural network. Each layer of a convolutional deep neural network may be referred to as a convolutional layer. Convolutional layers apply a convolution operation to the input (e.g., a voxel of the voxelized frame), passing the result to the next layer. DNN 44 may be configured with both 3D and 2D convolutional layers. The 3D convolutional layers provide for a more accurate feature extraction (e.g., more accurate identification of persons and/or objects), while the 2D convolutional layers provide for a faster feature extraction, as compared to the 3D convolutional layers.

One or more sections of the piece-wise network structure (e.g., see FIG. 3) of DNN 44 may be configured to first process the voxelized frame with one or more 3D convolutional layers, and then continue to process the voxelized frame with one or more 2D convolutional layers. The 2D convolutional layers may be configured to only process data from the voxelized frame in the X and Y direction (i.e., not in the Z direction). The number of 3D and 2D convolutional layers, and the division point between the layers determines the tradeoff between speed and accuracy of the environment perception task. By using a combination of 3D and 2D convolutional layers in DNN 44, environment perception may be performed with a desirable level of accuracy while also maintaining the speed useful for autonomous driving applications.

DNN 44 is configured to analyze the voxelized frame and produce one or more outputs for each of the voxels. As described above, one output may be called a classification and the other a regression. DNN 44 may be configured to perform the classification and regression techniques in serial or in parallel.

DNN 44 may be configured to process each voxel through DNN model 48. DNN model 48 defines the number of 3D and 2D convolutional layers as well as the function performed for each layer and for each section of the piece-wise network structure (e.g., see FIG. 3). DNN model 48 may be trained with a large number of data-label pairs. In the data label-pair, the data is the voxelized point cloud data, while the label is a possible classification of an environment perception task. DNN model 48 may be trained by manually annotating (e.g., labeling) point cloud data, and then training DNN 44 with the labeled data. The output of DNN 44 is compared to the expected output given the labeled data. Technicians may then adjust DNN model 48 to find an optimal set of weights for the layers of DNN 44 so that, given a pre-annotated point cloud, the desired label is predicted when processed by DNN 44. DNN model 38 may be predefined and may be periodically updated.

Post-processing unit 46 may be configured to turn the output of DNN 44 into a final output. For example, post-processing unit 46 may be configured to perform non-maximum suppression on the classified and estimated environment perception outputs produced by DNN 44 and produce a final location and/or classification of objects detected. Non-maximum suppression is an edge thinning technique. In some cases, DNN 44 will classify objects for many closely spaced groups of voxels where only one object actually exists. That is, in some circumstances, DNN 44 will detect overlapping duplicates of the object. Post-processing unit 46 may use non-maximum suppression techniques to remove duplicate objects. Post-processing unit 46 outputs any classification and/or regression results as perception data 32. Perception data 32 may include the location and/or classification of any objects and/or features in the environment captured in point cloud 30 and detected by LiDAR-based environment perception module 40 (e.g., in terms of GPS coordinates). Perception data 32 may be stored in memory 24, sent to autonomous driving application 52, other applications 54, or transmitted from computing system 14 to another computing system.

In one example, autonomous driving application 52 may be configured to receive perception data 32 and make autonomous driving decisions based on the data. Other applications 54 represent various other contexts in which perception data 32 may be used in other contexts. For example, the poses and locations of persons output by LiDAR-based environment perception module 40 may be used in various applications for body language recognition, motion understanding (e.g., traffic, police officers, emergency services personnel, or other personnel signaling/directing traffic), attention and intention detection (e.g., pedestrians waiting/crossing streets), movies, animation, gaming, robotics, human-computer interaction, machine learning, virtual reality, alternative reality, surveillance, abnormal behavior detection, and public security.

Figure 5:
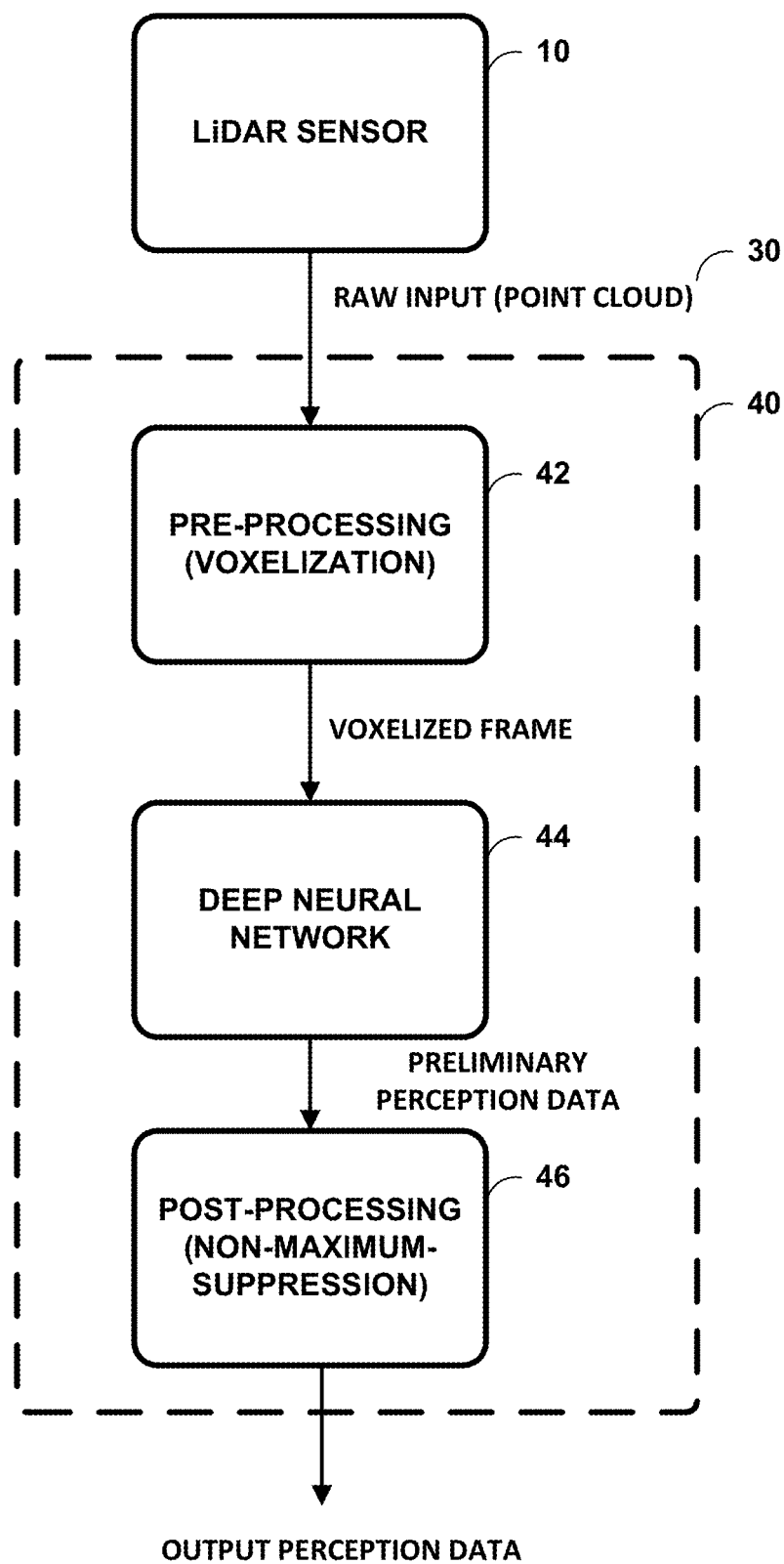
FIG. 5 is a block diagram illustrating a process flow of one example of the disclosure.

FIG. 5 is a block diagram illustrating a process flow of one example of the disclosure. As shown in FIG. 5, LiDAR sensor 10 may be configured to capture a point cloud 30 that is the raw input to LiDAR-based environment perception module 40. LiDAR-based environment perception module 40 processes point cloud 30 with pre-processing unit 42 (voxelization) to produce a voxelized frame that is divided into distance ranges. DNN 44 then processes the voxelized frame with different sections of a piece-wise network structure to produce classifications and/or regressions for one or more environment perception tasks. The output of DNN 44 are preliminary perception data. Post-processing unit 46 processes the preliminary perception data with a non-maximum suppression algorithm to produce the output perception data.

Figure 6:
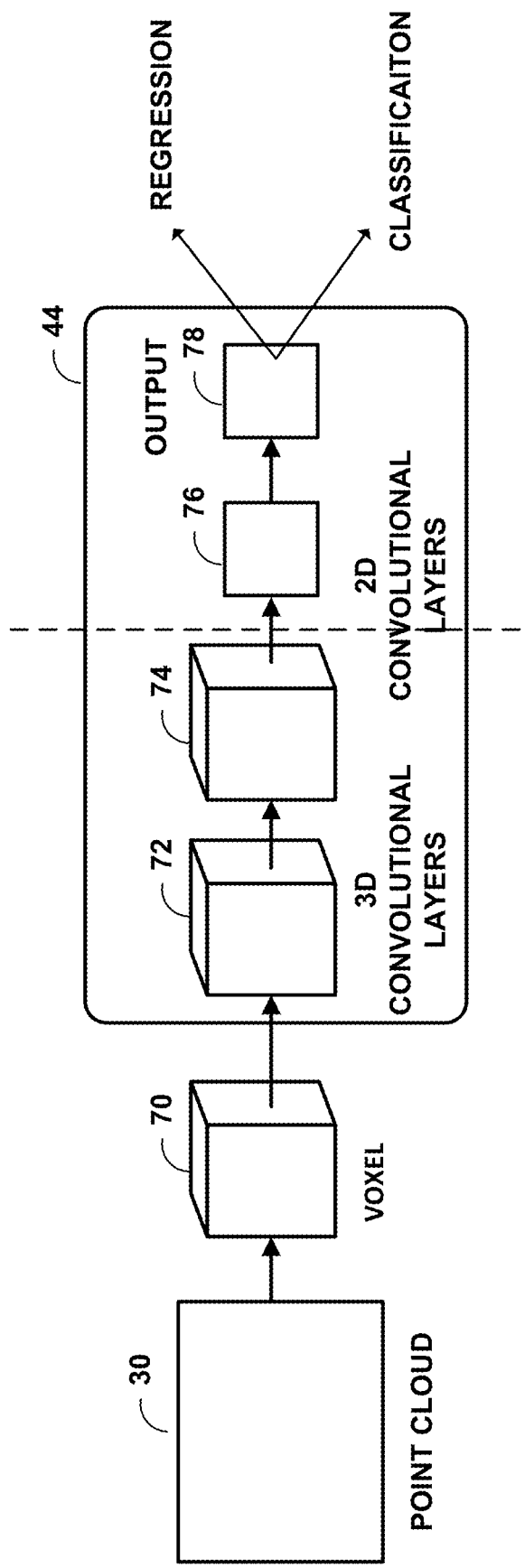
FIG. 6 is a conceptual diagram illustrating a parallel process flow using a neural network according to one example of the disclosure.

FIG. 6 is a conceptual diagram illustrating a parallel process flow using a deep neural network according to one example of the disclosure. As shown in FIG. 6, point cloud 30 is first converted to voxelized frame that includes a plurality of voxels. As described above, point cloud 30 is also divided into a plurality of distance ranges. In this example, DNN 44 processes each voxel 70 of each distance range of the voxelized frame using a different section of a piece-wise network structure (e.g., see FIG. 3).

DNN 44 processes voxel 70 obtained from point cloud 30 using one or more 3D convolutional layers 72. 3D convolutional layer 74 represents the last layer that operates on 3D voxel data. After 3D convolutional layer 74, DNN 44 processes voxel 70 with one or more 2D convolutional layers 76. The 2D convolutional layers 76 operate on only two dimensions of voxel data (e.g., XY data). 2D convolutional layer 78 represents the last 2D convolutional layer which outputs both a classification and a regression. In the example of FIG. 6, the layers of DNN 44 are configured to perform classification and regression techniques of environment perception tasks in parallel. That is, layers of DNN 44 may be configured to perform classification and regression for more than one voxel at the same time. As one example, for pose estimation, if DNN 44 determines that the voxel is not to be classified as a person, any estimated pose may be discarded. In other examples, DNN 44 may be configured to perform classification and regression techniques of environment perception tasks serially.

Figure 7:
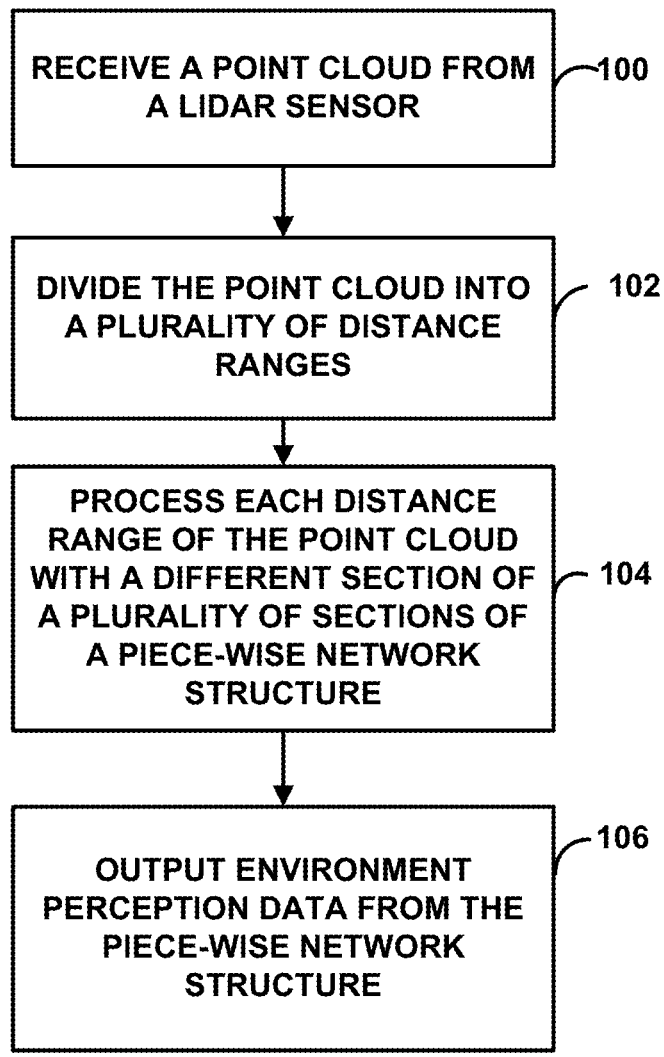
FIG. 7 is a flowchart illustrating an example operation of an apparatus configured to perform environment perception in accordance with one example of the disclosure.

FIG. 7 is a flowchart illustrating an example operation of an apparatus configured to perform pose estimation in accordance with one example of the disclosure. One or more processors may be configured to perform the techniques shown in FIG. 7, including processor 22 of computing system 14. As described above, in some examples, computing system 14 may be part of automobile 2. In this example, automobile 2 may be configured to use perception data produced by computing system 14 to make autonomous driving decisions. However, the techniques of this disclosure are not so limited. Any processor or processing circuitry may be configured to perform the techniques of FIG. 7 for environment perception for any number of applications, including alternative reality (AR), virtual reality (VR), gaming, human-computer interaction (HCI), surveillance and monitoring, and the like.

In one example of the disclosure, computing system 14 may include memory 24 configured to receive a point cloud 30 (see FIG. 2) from LiDAR sensor 10 (see FIG. 1). Computing system 14 may further include one or more processors implemented in circuitry (e.g., processor 22 of FIG. 2), the one or more processors being in communication with the memory. Processor 22 may be configured to receive the point cloud from the sensor (100). The point cloud includes a plurality of points representing positions of objects relative to the sensor. Processor 22 may be further configured to divide the point cloud into a plurality of distances ranges (102), and process the points in each distance range of the point cloud with a different section of a plurality of sections of a piece-wise network structure (104).

For example, processor 22 may be configured to process a first distance range with a first section, a second distance range different than the first distance range with a second section, and a third distance range different than the first and second distance ranges with a third section. The first, second and third distance ranges may be selected such that the point cloud data of the second distance range is further away from LiDAR sensor 10 than the point cloud data of the first distance range and the point cloud data of the third distance range is further away from LiDAR sensor 10 than the point cloud data of the second distance range. In some examples, each distance range may be 50 meters. In one example, to divide the point cloud into a plurality of distance ranges, processor 22 may be configured to divide the point cloud into a plurality of distance ranges based on a density of point cloud data in the point cloud. Processor 22 may be further configured to output environment perception data from the piece-wise network structure (106).

In one example of the disclosure, to process the points in each distance range of the point cloud with the different section of the plurality of sections of the piece-wise network structure, processor 22 may be further configured to process the point cloud at a first distance range with a first section of the piece-wise network structure, and process the point cloud at a second distance range with a second section of the piece-wise network structure, wherein the second distance range is farther from the sensor than the first distance range. To output the environment perception data from the piece-wise network structure, processor 22 may be further configured to output fine detail environment perception data from the first section of the piece-wise network structure, and output coarse detail environment perception data from the second section of the piece-wise network structure (e.g., coarse detail data from the second section and coarser detail from the third section of the piece-wise network structure).

In one example of the disclosure, the environment perception data is object detection and classification. In this example, the fine detail environment perception data includes object detection and classification into a first plurality of classes, wherein the coarse detail environment perception data includes object detection and classification into a second plurality of classes, wherein the second plurality of classes is smaller than the first plurality of classes. In other examples, the environment perception data is object detection and classification. In this example, the fine detail environment perception data includes object detection and classification arranged into a plurality of classes, and wherein the coarse detail environment perception data includes object detection only.

In still other examples, the environment perception data includes one or more of object detection, object classification, object tracking, free space segmentation, drivable space segmentation, or pose estimation.

In some examples, the piece-wise network structure is a piece-wise convolutional deep neural network. In one example, each section of the plurality of sections of the piece-wise network structure has a different structure. In another example, each section of the plurality of sections of the piece-wise network structure shares one or more middle layers of piece-wise convolutional deep neural network.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable data storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Any changes and/or modifications to the methods and apparatus of the techniques disclosed which are known to a person of ordinary skill in the art are within the scope of invention. Various examples of the invention have been described. These and other embodiments are within the scope of the following claims.

What is claimed is:

1. A method for environment perception, the method comprising:
   receiving a point cloud from a sensor, the point cloud including a plurality of points representing positions of objects relative to the sensor;
   dividing the point cloud into a plurality of distance ranges;
   processing the point cloud at a first distance range of the plurality of distance ranges with a first section of a plurality of sections of a piece-wise network structure;
   processing the point cloud at a second distance range of the plurality of distance ranges with a second section of the plurality of sections of the piece-wise network structure, wherein the second distance range is farther from the sensor than the first distance range; and
   outputting environment perception data from the piece-wise network structure, including outputting fine detail environment perception data from the first section of the plurality of sections of the piece-wise network structure, and outputting coarse detail environment perception data from the second section of the plurality of sections of the piece-wise network structure.

2. The method of claim 1, wherein the environment perception data includes object detection and classification, wherein the fine detail environment perception data includes object detection and classification into a first plurality of classes, wherein the coarse detail environment perception data includes object detection and classification into a second plurality of classes, and wherein the second plurality of classes is smaller than the first plurality of classes.

3. The method of claim 1, wherein the environment perception data includes object detection and classification, wherein the fine detail environment perception data includes object detection and classification into a plurality of classes, and wherein the coarse detail environment perception data includes object detection only.

4. The method of claim 1, wherein the environment perception data includes one or more of object detection, object classification, object tracking, free space segmentation, drivable space segmentation, or pose estimation.

5. The method of claim 1, wherein the sensor is a LiDAR sensor, and wherein the piece-wise network structure is a piece-wise convolutional deep neural network.

6. The method of claim 5, wherein each section of the plurality of sections of the piece-wise network structure has a different structure.

7. The method of claim 5, wherein each section of the plurality of sections of the piece-wise network structure shares one or more middle layers of a piece-wise convolutional deep neural network.

8. The method of claim 1, wherein dividing the point cloud into a plurality of distance ranges comprises:
   dividing the point cloud into a plurality of distance ranges based on a density of point cloud data in the point cloud.

9. An apparatus configured to perform environment perception, the apparatus comprising:
   a memory configured to receive a point cloud from a sensor; and
   one or more processors implemented in circuitry, the one or more processors in communication with the memory and configured to:
      receive the point cloud from the sensor, the point cloud including a plurality of points representing positions of objects relative to the sensor;

divide the point cloud into a plurality of distance ranges;

process the point cloud at a first distance range of the plurality of distance ranges with a first section of a plurality of sections of a piece-wise network structure;

process the point cloud at a second distance range of the plurality of distance ranges with a second section of the plurality of sections of the piece-wise network structure, wherein the second distance range is farther from the sensor than the first distance range; and output environment perception data from the piece-wise network structure, including outputting fine detail environment perception data from the first section of the plurality of sections of the piece-wise network structure, and outputting coarse detail environment perception data from the second section of the plurality of sections of the piece-wise network structure.

10. The apparatus of claim 9, wherein the environment perception data includes object detection and classification, wherein the fine detail environment perception data includes object detection and classification into a first plurality of classes, wherein the coarse detail environment perception data includes object detection and classification into a second plurality of classes, and wherein the second plurality of classes is smaller than the first plurality of classes.

11. The apparatus of claim 9, wherein the environment perception data includes object detection and classification, wherein the fine detail environment perception data includes object detection and classification into a plurality of classes, and wherein the coarse detail environment perception data includes object detection only.

12. The apparatus of claim 9, wherein the environment perception data includes one or more of object detection, object classification, object tracking, free space segmentation, drivable space segmentation, or pose estimation.

13. The apparatus of claim 9, wherein the sensor is a LiDAR sensor, and wherein the piece-wise network structure is a piece-wise convolutional deep neural network.

14. The apparatus of claim 13, wherein each section of the plurality of sections of the piece-wise network structure has a different structure.

15. The apparatus of claim 13, wherein each section of the plurality of sections of the piece-wise network structure shares one or more middle layers of a piece-wise convolutional deep neural network.

16. The apparatus of claim 9, wherein to divide the point cloud into a plurality of distance ranges, the one or more processors are further configured to:

divide the point cloud into a plurality of distance ranges based on a density of point cloud data in the point cloud.

17. The apparatus of claim 9, wherein the apparatus comprises an automobile that includes the sensor.

18. An apparatus configured to perform environment perception, the apparatus comprising:

means for receiving a point cloud from a sensor, the point cloud including a plurality of points representing positions of objects relative to the sensor;

means for dividing the point cloud into a plurality of distance ranges;

means for processing the point cloud at a first distance range of the plurality of distance ranges with a first section of a plurality of sections of a piece-wise network structure;

means for processing the point cloud at a second distance range of the plurality of distance ranges with a second section of the plurality of sections of the piece-wise network structure, wherein the second distance range is farther from the sensor than the first distance range; and means for outputting environment perception data from the piece-wise network structure, including means for outputting fine detail environment perception data from the first section of the plurality of sections of the piece-wise network structure, and means for outputting coarse detail environment perception data from the second section of the plurality of sections of the piece-wise network structure.

19. The apparatus of claim 18, wherein the environment perception data includes object detection and classification, wherein the fine detail environment perception data includes object detection and classification into a first plurality of classes, wherein the coarse detail environment perception data includes object detection and classification into a second plurality of classes, and wherein the second plurality of classes is smaller than the first plurality of classes.

20. The apparatus of claim 18, wherein the means for dividing the point cloud into a plurality of distance ranges comprises:

means for dividing the point cloud into a plurality of distance ranges based on a density of point cloud data in the point cloud.

\* \* \* \* \*